United States Patent
Livet

(10) Patent No.: US 12,106,554 B2
(45) Date of Patent: Oct. 1, 2024

(54) IMAGE SEQUENCE PROCESSING USING NEURAL NETWORKS

(71) Applicant: XZIMG LIMITED, Hong Kong (CN)

(72) Inventor: Nicolas Livet, Saint Egreve (FR)

(73) Assignee: XZIMG LIMITED, Hong Kong (CN)

( * ) Notice: Subject to any disclaimer, the term of this patent is extended or adjusted under 35 U.S.C. 154(b) by 469 days.

(21) Appl. No.: 17/619,968

(22) PCT Filed: Jun. 18, 2019

(86) PCT No.: PCT/EP2019/066031
§ 371 (c)(1),
(2) Date: Dec. 16, 2021

(87) PCT Pub. No.: WO2020/253947
PCT Pub. Date: Dec. 24, 2020

(65) Prior Publication Data
US 2022/0301295 A1    Sep. 22, 2022

(51) Int. Cl.
*G06V 10/82* (2022.01)
*G06N 3/044* (2023.01)
(Continued)

(52) U.S. Cl.
CPC ............. *G06V 10/82* (2022.01); *G06N 3/044* (2023.01); *G06N 3/084* (2013.01); *G06T 7/20* (2013.01);
(Continued)

(58) Field of Classification Search
CPC ...... G06V 10/82; G06V 10/70; G06V 10/806; G06V 10/765; G06T 9/002;
(Continued)

(56) References Cited

U.S. PATENT DOCUMENTS

2015/0279052 A1* 10/2015 Chen .................. G06F 18/2414
382/103
2018/0322365 A1* 11/2018 Yehezkel Rohekar .....................
G06F 18/2413
(Continued)

OTHER PUBLICATIONS

Badrinarayanan et al., SegNet: A Deep Convolutional Encoder-Decoder Architecture for Image Segmentation, IEEE Transactions on Pattern Analysis and Machine Intelligence, vol. 39, No. 12, Dec. 2017, pp. 2481-2495, doi.org/10.48550/arXiv.1511.00561.*
International Search Report issued on Mar. 13, 2020, in connection with corresponding international Application No. PCT/EP2019/066031 (4 pp.).
Written Opinion of the International Searching Authority issued on Mar. 13, 2020, in connection with corresponding international Application No. PCT/EP2019/066031 (6 pp.).
(Continued)

*Primary Examiner* — Guillermo M Rivera-Martinez
(74) *Attorney, Agent, or Firm* — NIXON & VANDERHYE

(57) ABSTRACT

A recurrent multi-task CNN with an encoder and multiple decoders infers single value output and dense (image) outputs such as heatmaps and segmentation masks. Recurrence is obtained by reinjecting (with mere concatenation) heatmaps or masks (or intermediate feature maps) to a next input image (or to next intermediate feature maps) for a next CNN inference. The inference outputs may be refined using cascaded refiner blocks specifically trained. Virtual annotation for training video sequences can be obtained using computer analysis. Benefits of these approaches allows the depth of the CNN, i.e. the number of layers, to be reduced. They also avoid parallel independent inferences to be run for different tasks, while keeping similar prediction quality. Multiple task inferences are useful for Augmented Reality applications.

20 Claims, 5 Drawing Sheets

(51) Int. Cl.
- *G06N 3/084* (2023.01)
- *G06T 7/20* (2017.01)
- *G06V 10/26* (2022.01)
- *G06V 10/764* (2022.01)
- *G06V 10/77* (2022.01)
- *G06V 10/772* (2022.01)
- *G06V 10/774* (2022.01)
- *G06V 10/80* (2022.01)

(52) U.S. Cl.
CPC ............ *G06V 10/26* (2022.01); *G06V 10/764* (2022.01); *G06V 10/7715* (2022.01); *G06V 10/772* (2022.01); *G06V 10/774* (2022.01); *G06V 10/80* (2022.01); *G06T 2207/10016* (2013.01); *G06T 2207/20084* (2013.01)

(58) Field of Classification Search
CPC ........... G06T 2207/20084; G06T 2207/10016; G06T 2207/20081
See application file for complete search history.

(56) References Cited

U.S. PATENT DOCUMENTS

| | | | |
|---|---|---|---|
| 2019/0043201 A1* | 2/2019 | Strong | G06V 10/96 |
| 2019/0075301 A1* | 3/2019 | Chou | H04N 19/132 |
| 2019/0092318 A1 | 3/2019 | Mei | |
| 2019/0180469 A1* | 6/2019 | Gu | G06V 40/167 |
| 2020/0213587 A1* | 7/2020 | Galpin | H04N 19/117 |
| 2021/0383169 A1* | 12/2021 | Wang | G06T 7/207 |

OTHER PUBLICATIONS

Peng, et al., "RED-Net: A Recurrent Encoder-Decoder Network for Video-Based Face Alignment", International Journal of Computer Vision, vol. 126, 2018, pp. 1103-1119 (18 pp.).

Li, et al., "Integrated Face Analytics Networks through Cross-Dataset Hybrid Training", [v1] Nov. 16, 2017, 10 pp., URL: https://arxiv.org/abs/1711.06055.com.

Chen, et al., "Multi-level Semantic Feature Augmentation for One-shot Learning", [v3] dated Oct. 2, 2021, 12 pp., URL: https://arxiv.org/abs/1804.052983.com.

* cited by examiner

IMAGE SEQUENCE PROCESSING USING NEURAL NETWORKS

This application is the U.S. national phase of International Application No. PCT/EP2020/066031 filed Jun. 18, 2019, the entire contents of each of which are hereby incorporated by reference.

FIELD OF THE INVENTION

The present invention concerns image processing, in particular image sequence processing using convolutional neural networks.

BACKGROUND OF THE INVENTION

Deep learning and more precisely Convolutional Neural Networks (CNNs), have installed themselves as a natural solution to solve Image Processing and Computer Vision's most challenging tasks due to their efficiency and their simplicity. Taking advantage of hidden layer architectures—composed of filters separated by non linearity activations—it is not required to design the filters manually. Instead one can rely on a simple yet efficient learning phase (back-propagation), which minimizes the overall loss while updating the model's filters (i.e. weights of the layers) throughout the network.

Illustrative examples of computer vision include recognition of rigid objects (such as cars, toys, etc.), analysis of non-rigid objects (such as faces, facial or "face" expressions, etc.) and/or segmentation of images into semantic layer masks corresponding to various classes.

For instance, CNNs are known to be used to explore human face features based on sequences of images in order to provide accurate positions of face features. Such positions can be used in Augmented Reality (AR)-based applications to render perfectly aligned computer-generated layers on top of a user's face. Exemplary AR-based applications include makeup trial applications that add makeup visual effects to detected face features of a user.

Similarly, CNNs can explore human bodies in order to provide accurate segmentation of body parts, for game applications (whether or not AR-based).

Known CNN-designed architectures are often based on available architectures such as VGG, Resnet, FCN-VGG, etc.

Different problems or tasks have to be addressed separately with the known techniques, i.e. by using a dedicated CNN for each task.

There is a need to provide efficient multiple-task architectures, i.e. CNN architectures that simultaneously address multiple related problems of different types.

SUMMARY OF THE INVENTION

The invention concerns an image processing device comprising a processor-implemented neural network. The neural network comprises:

an input block configured to obtain successive inference inputs from successive input images forming an input sequence, a layer-based neural encoder configured to determine, during an inference of the processor-implemented neural network, feature maps from one of the inference inputs, and multiple (i.e. two or more) layer-based neural decoders, each having at least one separate layer not shared with the other layer-based neural decoder or decoders, configured to generate, during the inference, multiple respective inference outputs from the feature maps, wherein at least one of the inference outputs is an inference output of image type spatially characterizing image content of the input image.

The same neural encoder thus produces the feature maps from which the various neural decoders generate the various outputs of different types.

Exemplary image-type inference outputs include heatmaps providing pixel probabilities that the pixels of the input image match an image feature (e.g. a face feature) or segmentation masks providing pixel probabilities that the pixels of the input image belong to an image/segmentation class (e.g. a body part). Preferably, the image-type inference outputs match inference input (image) resolution.

Non-image-type reference outputs may include a prediction value of an emotion or any other attribute of interest, usually in a form of a prediction vector of multiple emotions (or of another attribute).

According to the invention, the inference input of the layer-based neural encoder for a next inference of the processor-implemented neural network is built from a next input image of the input sequence and from at least one image-type inference output generated during a previous inference based on a previous input image in the input sequence. Two or more image-type outputs so generated can be used as prior knowledge for the following inference.

The invention thus defines a recurrent scheme where the next image is processed based on prior knowledge made of image outputs obtained from the neural network processing of the previous image (usually immediately preceding said "next" image in the sequence).

The present invention allows a CNN inference output (e.g. an ensemble (or a vector) of value characterizing attributes for the whole image, such as face emotions, or image segmentation masks or face feature heatmaps) to be generated from an inference input built from a different inference output (e.g. face feature heatmaps or segmentation masks). Known techniques only contemplate using recurrent neural networks with prior knowledge and inference output of the same nature. Indeed, the inventors have noticed improved accuracy of the inference outputs when they are built from other related (because characterizing the same object of interest in the input image) inference outputs.

Correspondingly, the invention also concerns an image processing method using a processor-implemented neural network, the method comprising the following steps:

obtaining successive inference inputs from successive input images forming an input sequence, and performing inferences of the processor-implemented neural network using the successive inference inputs, wherein performing an inference includes:

determining, using a layer-based neural encoder of the processor-implemented neural network, feature maps from one of the inference inputs, and generating, using multiple layer-based neural decoders, each having at least one separate layer not shared with the other layer-based neural decoder or decoders, multiple respective inference outputs from the feature maps, wherein at least one of the inference outputs is an inference output of image type spatially characterizing image content of the input image, wherein the inference input of the layer-based neural encoder for a next inference is built from a next input image of the input sequence and from at least one image-type inference output generated during a previous inference based on a previous input image in the input sequence.

Optional features of embodiments of the invention are defined in the appended claims. Some of these features are explained here below with reference to a device, while they can be transposed into method features dedicated to an image processing method.

In some embodiments, the image-type inference output generated during the previous inference is concatenated with the next input image to build the inference input for the next inference. The concatenation of images may include juxtaposing their planes (or channels), in which case the depth of the next input image is increased by the depth of the image-type inference output or outputs used as prior knowledge, to form the next inference input. Due to the nature of the channel-based concatenation, non-spatial (i.e. non-image-type) outputs generated from the previous inference (for instance a prediction value of a face emotion in the input image) are not used.

A variant to concatenating the planes may merely consist in adding planes one to each other (i.e. addition of values at pixel level). Of course, some planes may be added together, others not, and the resulting planes are concatenated.

In other embodiments, the processor-implemented neural network further comprises a preprocessing block configured to preprocess the image-type inference output before building the inference input for the next inference, wherein the preprocessing includes:

estimating a movement shift (or motion compensation) between the previous input image and the next input image, and shifting the image-type inference output by the estimated movement.

This compensation of the image-type inference output (or outputs) used as prior knowledge ensures realignment of pixels for combining pixel-related information from the image-type inference output and the next input image. As a result, inference outputs (of the neural network) are made more accurate.

In yet other embodiments, the processor-implemented neural network further comprises a block configured to preprocess the image-type inference output before building the inference input for the next inference, wherein the preprocessing includes:

fusing (i.e. merging), into a single image-type inference output to be used for the building of the inference input, a plurality of image-type inference outputs that spatially characterize various image contents of the input image. The fusing is usually performed on a pixel basis, for instance by taking the highest probability at each pixel position when the plural image-type inference outputs contain probabilities. This may be applied to feature heatmaps as described below, or to segmentation masks.

In some embodiments, the inference outputs include one inference output that merges two or more other inference outputs. For instance, the CNN may generate various feature heatmaps (or masks) together with an heatmap (or mask) corresponding to a fusing of all the feature heatmaps. In that case, the image-type inference output used to build the inference input for the next inference may advantageously be the merging inference output. Indeed, this offers fast processing for low resource devices. A similar process may generate a fused segmentation mask with different pixel values for different segmented regions.

In some embodiments, the inference outputs include one or more from:

feature heatmap images representing probabilities that the corresponding (i.e. usually collocated) pixels of the input image are located at respective image feature locations. In other words, a heatmap provides per-pixel probabilities (e.g. likelihood) that each collocated pixel in the input image corresponds to a predefined feature in the input image. For instance, a mouth-left-corner heatmap may represent the pixel-probabilities at each pixel of a face input image that the pixel corresponds to the left corner of the mouth, segmentation mask images representing probabilities that the pixels of the input image belong to respective image segmentation classes. In other words, a segmentation mask represents per-pixel probabilities that each collocated pixel in the input image belongs to a given segmentation class in the input image. A segmentation class may be any object of interest in the image or any portion thereof. For instance, a hair segmentation mask may represent the pixel-probabilities at each pixel of an input image that the pixel belongs to hair of an individual in the input image, a vector made of multiple probabilities of image classifications of the input image. Each probability provides a global classification or regression based on the entire input image or on a large portion thereof. The classes may correspond to various attributes of interest, such as emotion (happiness, etc.), actions (kiss, blinks, ect.), and so on.

The feature heatmaps and segmentation masks are dense outputs, i.e. image-type outputs spatially characterizing image content of the input image where each pixel characterizes the collocated pixel of the input image. They can thus be used as prior knowledge for a next inference.

Consequently, in embodiments, the at least one image-type inference output for building the inference input for the next inference is selected from:

a feature heatmap image representing probabilities that the corresponding pixels of the previous input image are located at an image feature location, and a segmentation mask image representing probabilities that the pixels of the previous input image belong to an image segmentation class.

In some embodiments, at least two of the layer-based neural decoders are multiple-layered and have at least one neural layer in common (i.e. shared between the decoders). Neural decoders that have common layers are preferably used to generate image-type inference outputs spatially characterizing image content of the input image, such as heatmaps and segmentation masks mentioned above. The common layers are preferably the first layers of the neural decoders (i.e. the layers directly processing the feature maps generated by the neural encoder). Then the layers of each such decoder that follow the layer in common are separate from those of the other such decoder or decoders, in order to specialize them.

This configuration inventively combines common processing to take advantage of the inter-dependencies between the outputs with differently trained specialized (separate) layers to ultimately produce outputs of different types.

In some embodiments, the processor-implemented neural network further comprises a post-processing block configured to post-process the image-type inference output generated during the inference to obtain a post-processed image-type inference output, wherein the post-processing includes:

applying a plurality of cascaded layer-based refiner blocks, each layer-based refiner block applying neural layers to a refiner input made
  from the input image and
  from the image-like inference output for the first layer-based refiner block of the plurality and from a refiner output of the preceding layer-based refiner block for the subsequent layer-based refiner blocks of the plurality.

The refiner input may be built by concatenation of channels of the two outputs used. Preferably, all the image-type outputs, refiner inputs and outputs have the same resolution to simplify processing.

More generally, the refiner block constitutes an inventive feature per se, independently of the above recurrent scheme that uses the inference output of one type as prior knowledge for a CNN generating an inference output of another type. This inventive feature may correspond to an image processing device comprising:

a processor-implemented neural network generating an inference output from an inference input, and a post-processing block configured to post-process the inference output, wherein the post-processing includes applying a plurality of cascaded layer-based refiner blocks, each layer-based refiner block applying neural layers to a refiner input made from the inference input and from the inference output for the first layer-based refiner block of the plurality and from a refiner output of the preceding layer-based refiner block for the subsequent layer-based refiner blocks of the plurality. A corresponding image processing method comprises the generating and post-processing steps.

The refiner blocks advantageously refine dense inference outputs, i.e. spatial images, at detected feature vicinities. For instance, they refine heatmap responses at face feature vicinities for a CNN trained to detect face features in images.

According to a specific feature, the image-type inference output used to build the inference input for the next inference is the post-processed image-type inference output. Refinement is thus taken into account in the prior knowledge used for the next CNN inference.

According to another specific feature, the processor-implemented neural network is trained by minimizing an overall loss estimated from an elementary loss associated with the inference outputs of the multiple layer-based neural decoders and from refiner losses associated with the refiner outputs of the layer-based refiner blocks respectively, i.e. one loss per refiner block.

Training sequence data, including "reference" images and corresponding reference outputs (all of these forming a plurality of annotated training sequences), are used for the training. A loss is usually a computed difference between the output provided by the neural network from at least one reference image (also known as feed forwarding) and the corresponding at least one reference output (i.e. expected true output) in the training data. Usually the loss is computed from several references images (and corresponding reference outputs) that form a batch or "mini-batch". Several mini-batches may be used successively to train the CNN.

The training is also known as learning, and the minimizing operation involves gradient back-propagation where the gradient is estimated based on the losses. The training usually aims at minimizing the overall loss while updating weights of the layers forming the neural network.

According to yet another specific feature, the training includes three sub-steps:

a first sub-step of training only the layer-based neural encoder and the multiple layer-based neural decoders by minimizing the elementary loss alone, a second sub-step of training only the layer-based refiner blocks by minimizing a loss estimated from the refiner losses only, and a final sub-step of training the whole layer-based neural network by minimizing the overall loss. This gradual training scheme proves to be efficient for the refiner blocks to be accurately trained.

In some embodiments of the invention, the processor-implemented neural network is trained using training data made of reference images and associated reference outputs, possibly in the form of a training sequence. The weights of the layers (of the encoder and decoders) are thus simultaneously back-propagation trained using the training data.

In the case of a recurrent neural network as above, a training input of the processor-implemented neural network for a training cycle can be built from a (one or more) next reference image of the training data and from the reference output or outputs associated with another reference image (usually a previous reference image in the training data).

The reference outputs associated with the training data preferably include reference outputs to be compared to outputs of layer-based neural decoders of the processor-implemented neural network being trained. The inventor has noticed that a training based on reference outputs of different types (corresponding to multiple tasks which are at least partially related to each other) provides better trained multi-task neural networks than separate ones.

There is a problem in obtaining such training data made of annotated (i.e. with reference outputs) reference images. It is a tedious task to annotate or label each image of a video sequence. In some embodiments, it is proposed to use annotated reference images (not necessarily from a sequence) and to create virtual reference output for a virtual image that could precedes the annotated image. Training data for recurrent CNN can thus be generated at low costs from annotated images that are not sequenced. In this approach, training data for a training cycle of the processor-implemented neural network are obtained by:

obtaining at least one first reference image and at least one associated first reference output, determining at least one transformation to be applied to an object in the first reference image, and applying the transformation to the first reference output to generate a previous reference output for the first reference image, wherein a training input of the processor-implemented neural network for the training cycle is built from the first reference image and the generated previous reference output, and a training output of the processor-implemented neural network for the training cycle is compared to the first reference output.

This approach thus substantially simplifies the annotation process: virtual reference outputs (e.g. virtual heatmaps and/or segmentation masks) are generated thanks to the transformations used.

More generally, the generation of a virtual training data from reference images constitutes an inventive feature per se, independently of the above recurrent scheme and above refiner blocks. This inventive feature may correspond to a neural network training method for training a processor-implemented neural network, the method comprising the following steps:

obtaining a first reference image and at least one associated first reference output, determining at least one transformation to be applied to an object in the first reference image, applying the transformation to the first reference output to generate a previous reference output for the first reference image, training the processor-implemented neural network during training cycles, wherein a training input of the processor-implemented neural network for a training cycle is built from the first reference image and the generated previous reference output, and a training output of the processor-implemented neural network for the training cycle is compared to the first reference output. A corresponding device for generating neural network training data comprises corresponding computer-implemented functional blocks.

Such generation of training data is particularly adapted for the training of recurrent neural networks where labelled reference images with reference outputs for previous images (i.e. usually annotated sequence of images) has to be used. It is even more adapted for multiple-task neural networks where the amount of labels for each reference image is made greater.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the image processing and neural network training methods.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

DETAILED DESCRIPTION

Figure 1:
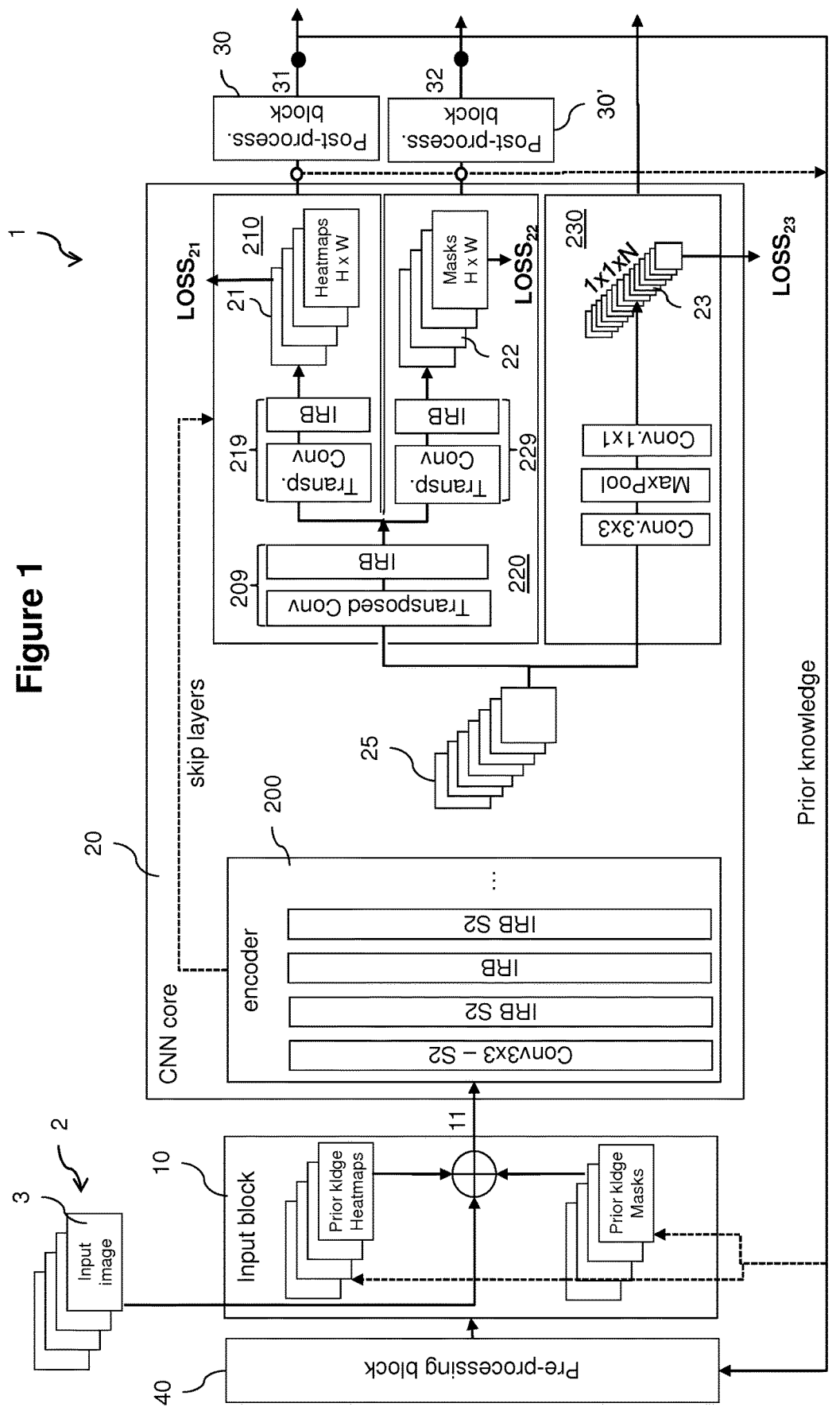
FIG. 1 illustrates a recurrent multi-task convolutional neural network according to embodiments of the invention.

Augmented Reality (AR) is an interactive experience of a real-world environment whereby the objects that reside in the real world are "augmented" by computer-generated perceptual information on a display.

To augment the real-world—in particular when the environment contains human bodies, human faces or even human organs—AR-based applications require accurately-positioned features (e.g. face features, human body features), segmentation masks (e.g. body versus background masks or arms vs. trunk), detecting movements, face emotions or other attributes of interest and potentially sensor data, to render perfectly aligned and integrated computer-generated layers on top of the captured and then displayed real-world objects.

Exemplary AR-based applications include a makeup virtual studio or kiosk where user's face features (skin, hair, face attributes such as cheeks or eyes, mood) are video-captured by a camera, detected in the captured video images and next modified by rendering "augmentation" layers on top of the captured video images. For illustrative purposes, the background can be modified, as well as the hair color; makeup modifying skin colors or eyes can be added, as well as accessories (sunglasses, jewels).

Another exemplary AR-based application concerns the tracking of individuals moving in front of a camera. Augmentations can be proposed that depends on the user's features and segmentation masks. For instance, user's detected joints (features) can control dancing movements of an avatar displayed on the same screen, the avatar being able to move in front and behind the displayed individual using segmentation masks around the body.

Other exemplary AR-based applications may concern medical imaging, entertainment such as games, head-up display for automotive or vehicle applications, and so on.

Exploring human body and face attributes and subtle body and face deformations based on sequences of images proves to be very complex tasks to obtain accurate positioned features or segmentation masks or detection of movements or of face emotions or of object properties or of any other attribute of interest.

Deep learning and more precisely Convolutional Neural Networks (CNNs) are natural processing solutions to solve complex problems or tasks, and more specifically to solve Computer Vision's most challenging (classification and regression) tasks.

The present invention provides an innovative neural network architecture which can solve simultaneously multiple, related, classification and regression problems (or tasks) from a sequence of input images, in a robust and efficient manner.

Multiple related problems regard separate subparts of the neural network that provide plural outputs of different types. For instance, a neural encoder part determines, during an inference, bottleneck feature maps from an inference input. Two or more at least partly separated neural decoder parts, i.e. wholly separated or with decoding subparts that are separate between decoders, generate two or more respective inference outputs from the bottleneck feature maps. Each inference output corresponds to the solving of one of the multiple related problems or tasks given the inference input, for instance a heatmap locating a given face feature or a segmentation mask showing the pixels belonging to the same object.

The inference input is usually built from an input image of the (input) sequence to analyze.

The outputs may be of various resolutions, from a single value (or a vector of single values) classifying the entire input image to a spatial output of image type spatially characterizing image content of the input image at pixel level. The image-type output may have the same resolution as the input image (and possibly the inference input) so that each pixel value in the image-type output characterizes the collocated pixel of the input image given the problem to solve.

As described below an exemplary innovative neural network architecture implements three main concepts that can be implemented independently of each other.

First, the architecture implements a temporal or recurrent approach where past outputs are used to infer new outputs from new inputs. In other words, the inference input of the neural encoder for a next inference is built from, of course, the next input image to be analyzed, but also from at least one image-type inference output generated during a previous inference made based on a previous input image of the sequence. A mere concatenation of their respective channels can be implemented. This means that some inference outputs are now inferred by the convolutional neural network using temporal inference outputs related to another problem (and not to the same problem). This is a new approach that unexpectedly provides a more accurate CNN for Computer Vision's tasks.

Second, the architecture implements specialized cascaded refiner blocks that post-process a given inference output of the CNN. Various sets of refiner blocks may be used for various inference outputs of the CNN. Particularly, each refiner block applies neural layers to a refiner input made from the given input image and from the inference output (for the first refiner block in the cascade) or from a refiner output of the preceding refiner block (for the next refiner blocks in the cascade). The resulting refined output may be used as temporal knowledge for the next inference as introduced above. A general training of the CNN with the refiner blocks, based on losses evaluated at each refiner blocks, efficiently trains the CNN. Obtained image-type inference output are thus refined at vicinities of detected feature (for heatmaps) or refined along object borders (for segmentation masks).

Third, a subsequent amount of annotated training data is needed to appropriately train the CNN, in particular when it is a recurrent multiple-task network. To avoid the tiresome and difficult work of annotating video sequences, annotation for a virtual previous image of an existing annotated image can be built from the image and its associated annotations. For instance, one or more transformations (that simulate a temporal object movement) to be applied to an object in a first reference image are determined; next, the transformation or transformations are applied to the first reference output (corresponding to the annotations) associated with the first reference image to generate a virtual previous reference output for the first reference image; finally, the CNN can be trained during a training cycle wherein a training input of the CNN for the training cycle is built from the first reference image and the generated previous reference output, and a training output of the CNN for the training cycle (i.e. obtained from the CNN by the training cycle) is then compared to the first reference output. This approach thus generates virtual prior knowledge from annotated images, in order to have training data at low processing cost.

The following description of the exemplary innovative neural network architecture concentrates on the obtaining of multiple related predictions on a predefined complex non-rigid object, for instance predicting information on human faces, human hands and human bodies. Prediction information includes feature heatmaps for face, hands or body features, segmentation masks on face, hands or body parts and/or vectors of image classifications such as a face emotion, hand gestures. Of course, the innovative architecture may be used on other types of complex objects and for other purposes.

FIG. 1 illustrates the proposed CNN architecture 1 that processes an input sequence 2 of input images 3 to obtain predictions of plural processing tasks on these input images. In this example, face feature heatmaps, segmentation masks and emotion prediction are produced. Of course, other types of outputs could be implemented.

Input images 3 may be color (RGB) images with or without depth channel. For instance, input images can contain a channel (additional to RGB channels) corresponding to the per-pixel depth provided by an infrared capable device (e.g. Microsoft Kinect).

Temporal recurrent CNN 1 comprises an input block 10, a layer-based CNN core 20, one or more optional post-processing blocks 30, 30' and one or more optional pre-processing blocks 40.

The input block 10 receives successive input images 3 of the input sequence 2 and provides successive inference inputs 11 to the layer-based CNN core 20 for inferences. The inference input 11 is an image of resolution H×W with a plurality of channels (including red, green, blue channels, a depth channel when using an infrared capable capture device for instance but also prior knowledge channels as explained below).

The layer-based CNN core 20 receives an inference input H×W from input block 10 and generates (infers) plural inference outputs 21, 22, 23 in a single pass (inference) corresponding to plural tasks predicted by the CNN.

Outputs 21 may include face feature heatmaps, preferably H×W images representing probabilities that the corresponding (i.e. usually collocated) pixels of the input image 3 are located at respective face feature locations. One heatmap is dedicated to a given feature to locate. Therefore, plural heatmaps are inferred (reconstructed) to predict locations of plural respective face features. In a variant, a single heatmap may be directly obtained from the CNN that fuses all heatmaps dedicated to respective features. In a further variant, the single (fusing) heatmap may be additional to the face feature heatmaps corresponding to respective individual features.

Outputs 22 may include segmentation masks, also H×W images, representing probabilities that the pixels of the input image belong to respective image segmentation classes. A segmentation mask is dedicated to a given class (e.g. background of the image, hair, body, etc.). Therefore, plural segmentation masks are inferred (reconstructed) to predict segmentation of the input image according to plural respective classes. In a variant, a single segmentation mask may be directly obtained from the CNN that fuses all masks dedicated to respective classes. In a further variant, the single (fusing) segmentation mask may be additional to the segmentation masks corresponding to respective plural respective classes.

Feature heatmaps 21 and segmentation masks 22 are dense outputs of image type, thereby offering spatial coherence. They are named image-like (inference) outputs.

Feature heatmaps 21 and segmentation masks 22 can be reconstructed at different resolutions depending on the number of down-sampling and up-sampling layers in the architecture as described below. Feature heatmaps 21 (or segmentation masks 22) can be seen as a plurality of 1-channel images or as a single plural-channel image. This is equivalent.

Outputs 23 may include a vector made of multiple probabilities of entire image classifications of the input image. For instance, the vector may reflect detected human emotion of a face in the image, such as happiness, anger, sadness, fear, contempt, neutral, etc. and/or also other attributes of interest. A vector of size N indicates the prediction of N human emotions or absence of emotions (or other attributes).

The layer-based CNN core 20 comprises a layer-based neural encoder 200 generating intermediate feature maps and comprises multiple layer-based neural decoders 210, 220, 230 reconstructing dense per-pixel (i.e. image-type) outputs and/or detecting single outputs. Encoder 200 and decoders 210, 220, 230 form a Fully Convolutional Network.

The layer-based neural encoder 200 determines bottleneck feature maps 25 from the inference input 11. It approximates image features at low resolution, limiting large errors. Feature maps 25 thus have a lower resolution than the inference input 11, but a higher number of channels characterizing the image features.

As commonly known, the encoder 200 is composed of series of convolutions, non-linearity (activation) operations such as ReLu, Tanh, Sigmoid (not shown in the Figure for ease of illustration) combined with downscaling operators (either by striding the convolution or using pooling operations).

In the example shown, the layer-based neural encoder 200 is based on a fully convolutional adaptation of the Google Mobilenet v2 architecture (registered trademarks). It is composed of a first 3×3 convolution operator as a first input layer and Inverted Residual Blocks (IRB) as hidden layers to produce the bottleneck feature maps 25. Of course other type and/or arrangements of layers can be used with different depths.

The multiple layer-based neural decoders 210, 220, 230 generate inference outputs 21, 22, 23 from the same bottleneck feature maps 25.

They are fully separate decoders or at least have separate subparts (i.e. separate hidden layers), so that they can be partly specialized for the specific Computer Vision problem they deal with. This means they have a separate arrangement of layers, although subparts of the arrangement may be in common.

Convolutional neural decoder 210 generates feature heatmaps 21. Convolutional neural decoder 220 generates segmentation masks 22.

Convolutional neural decoders 210, 220 are multiple-layered. They possibly have hidden layers 209 in common but have separate hidden layers 219, 229 specialized (after CNN training) to generate feature heatmaps (for layers 219) and segmentation masks (for layers 229). Using decoding subparts made of separate layers make it possible for the neural network to be adapted to each specific problem. This is because the training phase will generate filter weights optimized for corresponding problem. In other words, the neural network can specialize for a specific problem inside the decoder part.

The separate subparts of two decoders may be identical or made of different layers or of a different arrangement of similar layers.

The convolutional neural decoders 210, 220 reconstruct per-pixel regressions and classifications at a higher resolution than the bottleneck feature maps 25. They take advantage of transposed convolutions and/or up-pooling operators to obtain inference outputs at higher resolutions (image-like inference outputs), here feature heatmaps 21 and segmentation masks 22 of the same resolution H×W as the input 11.

As shown, exemplary hidden layers 209 in common include one or more pairs of 4×4 Transposed Convolution operators and Inverted Residual Blocks (IRBs). Similarly, exemplary separate hidden layers 219/229 include one or more pairs of 4×4 Transposed Convolution operators and Inverted Residual Blocks. Of course, other arrangements of layers can be used.

Skip layers which connect strided convolutions may be provisioned that create shortcuts between down-sampling modules of the encoder 200 and up-sampling modules of the decoders 210, 220 to improve the quality of the learning or training of the CNN 1. Skip layers are well-known by one skilled in the art.

A last pointwise convolution Conv1×1 (not shown) may be added as a last layer of the decoders to reduce the output depth to obtain the appropriate number of feature heatmaps 21 or segmentation masks 22.

Convolutional neural decoder 230 is fully separated from decoders 210 and 220. It is made of a fully connected branch from the bottleneck feature maps 25 to generate the N-sized vector of N human emotions or absence of emotions 23 (and/or any other attribute of interest).

As shown, an exemplary fully connected branch may comprise one or more 3×3 convolution operators (or other type of IRB layers), a MaxPool layer (performing a sample-based discretization process) and one or several pointwise convolutions Conv1×1. Of course, other arrangements of layers can be used.

Each of the inference outputs 21, 22, 23 is associated with a loss, respectively $LOSS_{21}$, $LOSS_{22}$ and $LOSS_{23}$. As known, these losses are used during the training (learning) of the CNN 1 using training data, i.e. one or more annotated sequences of reference images. The learning phase is described below.

The inference outputs 21, 22, 23 may be exploited as such by an AR-based application or be refined using post-processing.

Inference output 23 gives classes characterizing the entire input image 3, e.g. face emotions.

Inference outputs 22 segment the input images into images portions, e.g. into a background and various parts of a body.

Inference outputs 21 provide per-pixel probabilities of feature locations, e.g. face features, hands, arm joints, etc. A Gaussian function may be mapped onto the probabilities obtained (using conventional techniques, such as least-squares methods) to provide accurate subpixel location or another CNN may be used to regress precise feature subpixel location.

Optional post-processing blocks 30 is dedicated to one type of image-type inference output, meaning that a post-processing block 30 is required to refine feature heatmaps 21 and another separate post-processing block 30' is required to refine segmentation masks.

Figure 1A:
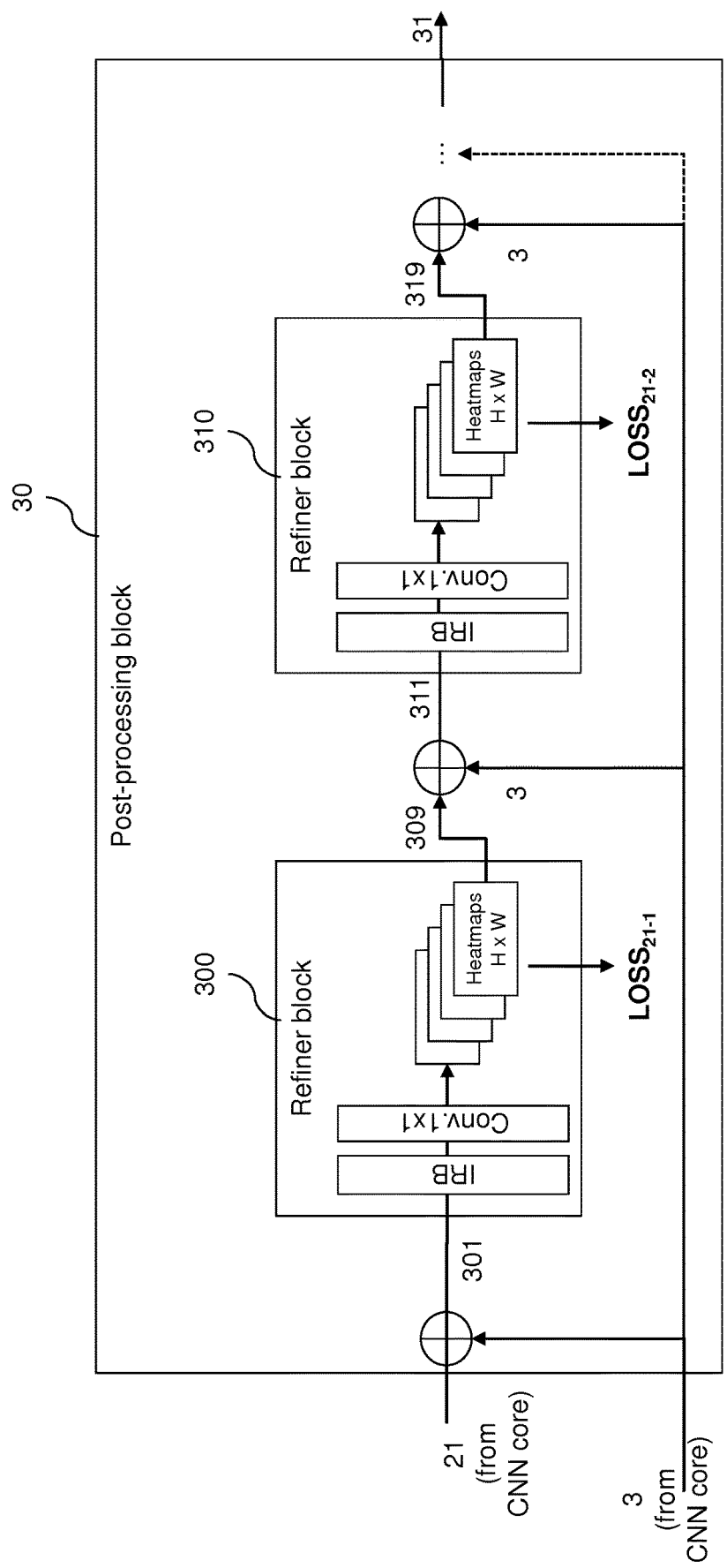
FIG. 1a illustrates a post-processing block of the network of FIG. 1 according to embodiments of the invention.

A detailed exemplary post-processing block 30 is shown in FIG. 1a.

The exemplary post-processing blocks 30 is made of a plurality of cascaded refiner blocks 300, 310 which may be identical or different one from the other. Each refiner block applies CNN layers to a refiner input 301, 311 to obtain a refiner output 309, 319. The refiner output of the last cascaded refiner block is a refined output, typically refined feature heatmaps 31 or refined segmentation masks 32.

As shown, an exemplary refiner block 300, 310 is made of a first series of IRB operators and a last pointwise convolution Conv1×1 as last layer, to obtain the appropriate number of H×W refiner outputs (the number of feature heatmaps or of segmentation masks). Of course other arrangements of layers can be used.

Each refiner block advantageously refines feature heatmap or segmentation mask responses at feature vicinities or at mask borders vicinities.

The refiner blocks are cascaded meaning the refiner input 311 of a next refiner block 310 is built from the refiner output 309 of the preceding refiner block 300. The inference output (e.g. the heatmaps) of the CNN core 20 to refine may be used as refiner input 301 of the very first refiner block 300.

Furthermore, a refiner input may be enriched with the input image 3. In other words, the refiner input is also built from the input image 3. This is to give the refiner substantial information about the image to be refined as it has been at least partially lost during the inference to obtain inference output 21. In other words, the refiner will take into account the pixels of the original image that lies near the feature locations or near the border of the segmentation mask. In that case, the inference output 21 and the input image 3 are combined, for instance through a mere concatenation of their channels.

For instance, the plurality of inference heatmaps 21 is concatenated with the plurality of input channels 3 in order to form the refiner input 301 for refiner block 300. This operation is repeated for next refiner blocks 310 (input channels 3 concatenated with refiner output 309 to form refiner input 311), and so on.

Because the refiner blocks are made of CNN layers, they have to be trained using training data. Each of the refiner outputs 309, 319 is thus associated with a loss, respectively $LOSS_{21-1}$, $LOSS_{21-2}$ and so on (for post-processing blocks 30 refining inference output 21). These losses can be used in a general architecture loss driving the training (learning) of the whole CNN 1 and/or the post-processing blocks 30. The training is described below.

Where a post-processing block (e.g. 30, 30') is implemented to refine an inference output (e.g. 21, 22), the corresponding refined output (e.g. 31, 32) can be used by an AR-based application. Where no post-processing block is implemented to refine an inference output (e.g. 23), the latter is used by the AR-based application.

As mentioned above, the architecture proposed in FIG. 1 implements a temporal or recurrent approach. Previous dense inference outputs 21, 22 or refined outputs 31, 32 (feature heatmaps and/or segmentation masks) are used as prior knowledge for a next inference based on a next input image 3. Preferably, the image-type outputs of the last processed input image are considered as prior knowledge for the next input image (which may be the input image immediately following the last processed input image in the input sequence 2).

Such prior knowledge outputs are re-injected to the current input image to form the next inference input 11. This reinjection is handled by input block 10 (see the arrows at the bottom of the Figure).

Consequently, provided that feature heatmaps are used as prior knowledge, next inferred segmentation masks 22 (or refined masks 32 if any) and next inferred emotions 23 depend on previously inferred feature heatmaps. Similarly, next inferred feature heatmaps 21 (or refined heatmaps 31 if any) and next inferred emotions 23 may depend on previously inferred segmentation masks. This inter-task temporal dependency is a new feature compared to known techniques.

Input block 10 thus modifies the next input image 3 by stacking the feature heatmaps and/or the segmentation masks obtained from the previous inference (with or without refining by post-processing blocks 30, 30') to the input RGB image 3. It thus combines current input color (optionally with depth) image with the prior knowledge outputs. The stacking may correspond to a mere concatenation of these various H×W images, i.e. a juxtaposition of their respective channels. The inference input 11 is thus a H×W image with a number of channels comprising each of the RGB (and optionally depth) components and each of the feature heatmaps/segmentation masks of the previous inference (used as prior knowledge).

Where the input image 3 and the prior knowledge outputs 21, 22, 31, 32 have different resolutions, the edges of any low-resolution image can be padded with black pixels to match the highest resolution H×W. In a variant, the low-resolution image may be resized using bilinear interpolation.

To reduce computation complexity, in particular during training of CNN 1, prior knowledge image-like outputs 21, 22, 31, 32 that spatially characterize various image contents of the input image (e.g. face features or body segmentation) can be fused or merged into a single prior knowledge image. For instance, all the heatmaps (refined or not) of a previous inference are merged into a single heatmap for use as prior knowledge for the next inference. The merger may keep the maximum value of all collocated pixels throughout the merged heatmaps. Similarly, all the segmentation masks obtained from the previous inference can be fused into a single segmentation mask with different pixel values for different segmented regions.

A by-default prior knowledge can be used in case no prior knowledge outputs are available (this is the case for the very first input image 3 to be processed). For instance, a by-default heatmap may be constructed based on a centered mean shape.

Where the resolution of the input image 3 does not match a H×W working resolution of the CNN 1, the input block 10 may crop the input image 3 to match the working resolution.

Further to temporal feedback based on previous inference outputs, temporal feedback within the CNN core 20 may also be implemented. It means that the recurrence from one previous inference to a next one may act on feature maps internal to CNN core 20 (i.e. intra-core recurrence). For instance, bottleneck feature maps $25(t-1)$ of previous inference t−1 could be reinjected with bottleneck feature maps $25(t)$ during the next inference t. Bottleneck feature maps $25(t-1)$ and bottleneck feature maps $25(t)$ could be concatenated, added or averaged at pixel level to form feature maps for the decoders. Of course, the same principle of intra-core recurrence can be applied to other feature maps than the bottleneck ones.

Prior knowledge outputs may not be pixel-aligned with the next input image to be processed. This is because some objects in the input images 3 of the input sequence 2 may move from one image to the other. This misalignment impacts the next inference input 11 and then the quality of the next inference by the CNN 1.

To correct such misalignment, the prior knowledge outputs, either previous inference outputs 21, 22 or previous refined outputs 31, 32 may be pre-processed by pre-processing block 40 (or one pre-processing block for the feature heatmaps and a different one for the segmentation masks).

Pre-processing block 40 first estimates an amount of movement which occurs between the previous input image (considered for the prior knowledge) and the next input image to be currently processed. Various methods may be used, applied separately or combined, to estimate the frame-to-frame movement: an image centric estimation of the movement, a camera centric estimation of the movement or an object centric estimation of the movement.

The image centric estimation relies on finding corresponding pairs of regions, landmarks (such as corners, face features, etc.) in the previous and next input images. These pairs can be retrieved efficiently using template matching or fast standard descriptor matching techniques (ZNNC correlator, optimized SIFT, etc.). Such an estimation method provides robust pairs for consecutive or nearly consecutive input images of the input video sequence 2. Once retrieved and validated, these pairs can be used to estimate a camera 3D movement in the environment. A corresponding frame-to-frame transformation can then be calculated.

The camera centric estimation relies on a sensor which can retrieve the movement of the device attached to the camera acquiring the input sequence 2 of input images 3. Standard IMU (Inertial Measurement Unit) provides up-to 9 degrees of freedom including acceleration (provided by an accelerometer), rotations (provided by a gyroscope) and referenced direction vector (provided by a magnetometer). By integrating acceleration and relying on rotations, camera movements can be estimated and then an accurate frame-to-frame transformation can be calculated.

The object centric estimation can be obtained by tracking object movements using corresponding pairs on the object (as for the image centric estimation), object's geometry and object pose at the previous input image. This information allows a shift in the pose of the object to be estimated. The shift may be a 2D displacement or more complex displacement (3D affine, projective transformation, etc.). This defines a frame-to-frame transformation.

These estimation methods can be combined to obtain a refined estimation. For instance, the IMU-based detected movement can be combined with the movement estimated by any of the two other methods.

Regardless of the method used, the obtained frame-to-frame transformation defines how the pixels of the previous input frame, and hence of the prior knowledge images, project into the next input frame. The frame-to-frame transformation is thus applied to the prior knowledge images 21, 22, 31 or 32. This shifts these prior knowledge images by the estimated movement to align their pixels with the corresponding ones of the next input image 3. The concatenation of the next input image 3 with the realigned prior knowledge images can then be performed.

In one embodiment reducing computation complexity, the prior knowledge images of the same type (e.g. feature heatmaps or else segmentation masks) can be fused or merged into a single prior knowledge image before performing the pixel realignment by pre-processing block 40. Such merger is described above with reference to input block 10.

Figure 2:
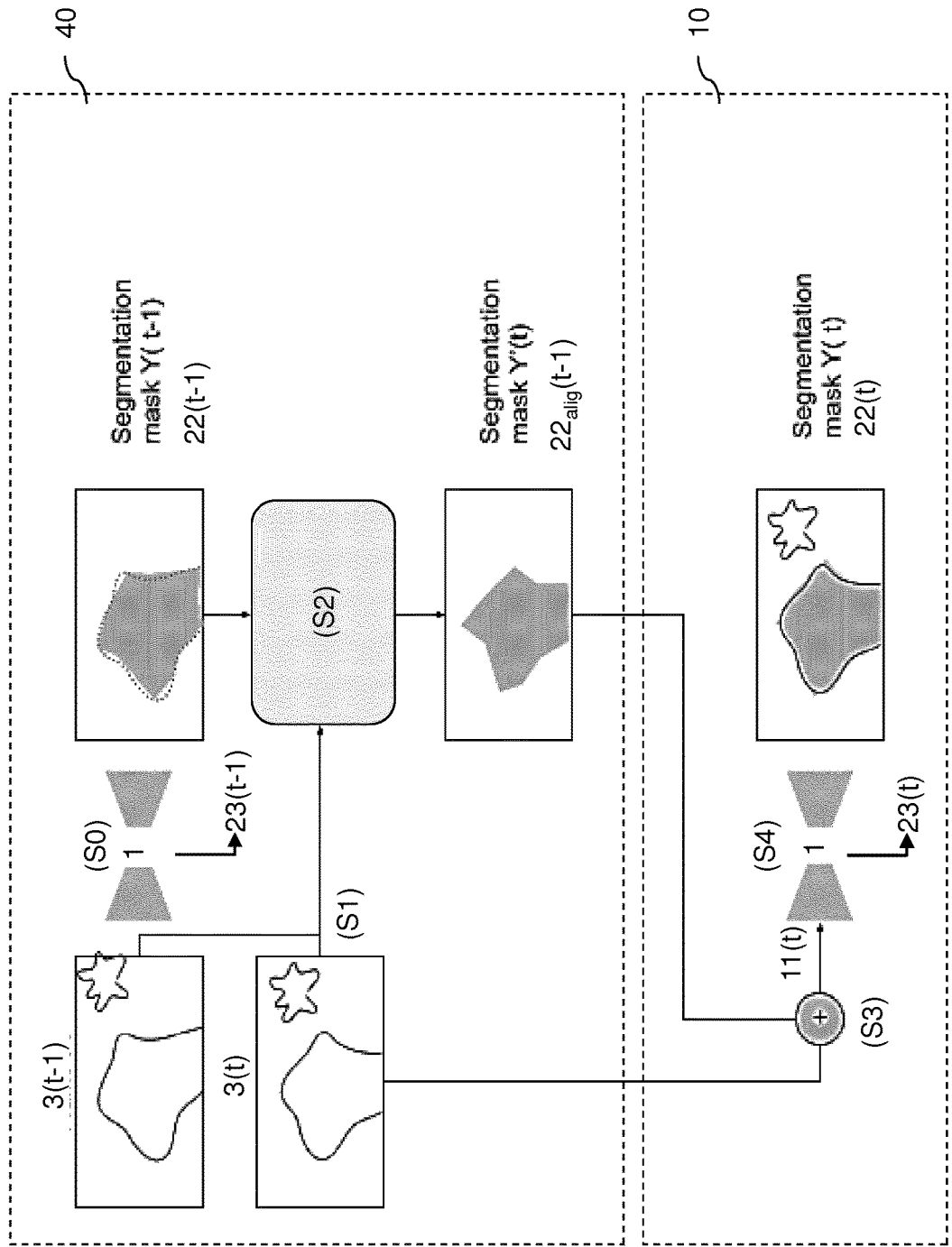
FIG. 2 illustrates exemplary pre-processing of prior knowledge and input images according to embodiments of the invention.

The pre-processing by pre-processing block 40 and concatenation with input image 3 by input block 10 are schematically illustrated in FIG. 2 using a segmentation mask 22 as prior knowledge image. "t−1" refers to the previous inference while "t" refers to the subsequent inference.

The previous inference of input image 3(*t*−1) by CNN 1 produces inference outputs 21, 22, 23, a segmentation mask 22(*t*−1) of which and a prediction emotion vector 23(*t*−1) of which are shown (step S0).

A comparison is made by pre-processing block 40 between input image 3(*t*−1) and input image 3(*t*) in order to determine a frame-to-frame transformation (step S1).

This frame-to-frame transformation is applied (step S2) to previous segmentation mask 22(*t*−1) to obtain a realigned segmentation mask 22$_{alig}$(t−1).

The realigned segmentation mask 22$_{alig}$(t−1) (considered as prior knowledge) and the next input image 3(*t*) are then combined (step S3) by input block 10 to produce the inference input 11(*t*) for the next inference.

The next inference (step S4) produces new inference outputs 21, 22, 23, a segmentation mask 22(*t*) of which and a prediction emotion vector 23(*t*) of which are shown at the bottom of the Figure.

The movement estimation by pre-processing block 40 advantageously allows any cropping of an input image 3 or of a prior knowledge output image 21, 22, 31, 32 (in order to match a working resolution) to be performed at the right position to have, at each pixel location, collocated pixels in all the images to concatenate.

Figure 3:
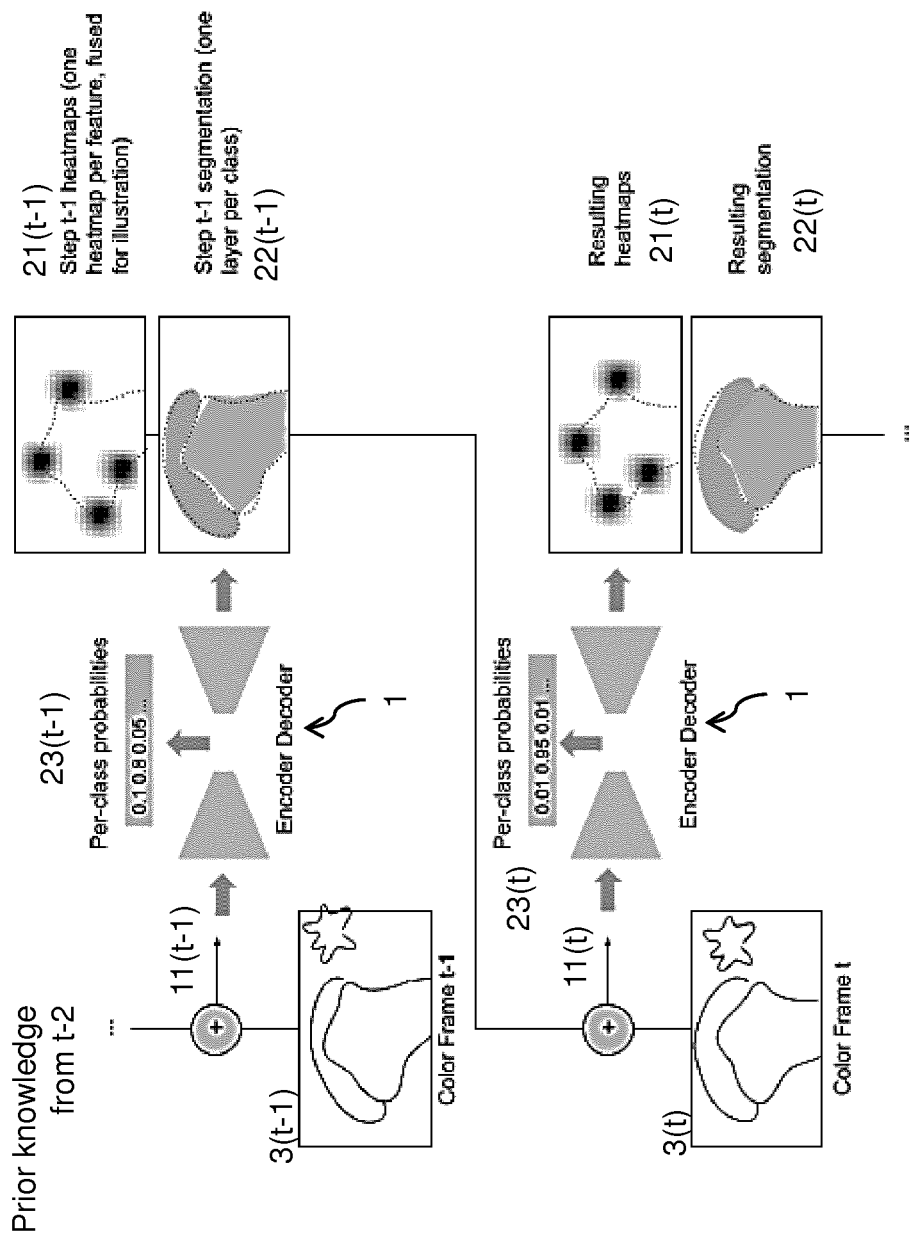
FIG. 3 illustrates consecutive temporal-based inferences of multiple input images according to embodiments of the invention.

As explained above, the reinjection of prior knowledge for a next inference directly impacts inference outputs obtained by decoders different from the one of the reinjected prior knowledge. This is because the inference of these different-type outputs relies on common layers at the encoder 200 and sometimes at a subpart of the decoders. FIG. 3 schematically illustrates consecutive temporal-based inferences of multiple input images 3.

Input image 3(*t*−1) is concatenated with prior knowledge from t−2 to obtain inference input 11(*t*−1). The latter feeds CNN 1 for inference t−1. Inference outputs, heatmaps 21(*t*−1), masks 22(*t*−1) and per-class probabilities vector 23(*t*−1), are obtained.

Masks 22(*t*−1) are used as prior knowledge for the next inference t. They are combined with next input image 3(*t*) to form inference input 11(*t*). The latter feeds CNN 1 for inference t. Inference outputs, heatmaps 21(*t*), masks 22(*t*) and per-class probabilities vector 23(*t*), are obtained.

This is repeated for all input images 3 of the input sequence 2.

We can see that heatmaps 21(*t*) and per-class probabilities vector 23(*t*) are influenced by the prior knowledge 22(*t*−1) which is another type of inference output (namely segmentation masks). The inventor has observed that this inter-task influence through prior knowledge reinjection has substantial benefits for CNN inferences. In particular, better CNN predictions are obtained by a two-task CNN trained by two sets of training data, compared to two single-task CNNs separately dealing with each prediction task and being trained by the single corresponding set of training data.

As is well known, CNN 1 must be trained using one or more sets of training data. The training data are made of annotated (or "labelled") video sequences, i.e. training sequences of reference images and associated reference outputs, for instance true feature heatmaps, true segmentation masks and/or true per-class probabilities vector corresponding to each reference image. A true feature heatmap $H_l(p)$ may be built by considering the true location $x_l$ of the feature l considered and then by using a rescaled Gaussian function with the peak centered at this true location:

$$H_l(p) = \exp(-\beta \|p - x_l\|_2^2)$$

where β is a rescaling parameter and p identifies a pixel throughout the heatmap.

A reference image may be associated with reference outputs corresponding to all true outputs or to only part thereof (in that case labels are missing). The whole set of training data used for the training finally comprises reference outputs for all the tasks (i.e. inference outputs) even if the reference images taken individually are not associated with reference outputs for all the tasks but only for a part thereof.

The mechanisms of training a CNN are well-known: a set of labelled training data is submitted to the CNN and architecture's weights at the layers throughout the network are updated through gradient back propagation minimizing an overall loss.

As the CNN is recurrent, a reference image in the training data is first combined with relevant prior knowledge made of reference outputs of a previous reference image (e.g. the preceding one in the training sequence). The result is fed to the CNN 1 to infer outputs. The latter are compared to the (true) reference outputs associated with the processed reference image, to calculate an error (the overall loss). The error over a subset of the training data is then minimized by updating the architecture layer weights through back-propagation of the gradient throughout the layers in the reverse order. Weights are updated using gradient descent techniques (e.g. stochastic gradient descent, Mini-batch gradient descent, using momentum, weight decay, etc.) which contains multiple hyper-parameters to be tuned, some of which are the learning rate and the weight decay.

Various formulae of the overall loss L and of the gradient based on the overall loss L can be used which influence the CNN prediction accuracy. L-based gradient formula are well-known.

When dealing with pure classification, a log-loss can be used. Otherwise, a L2 or a differentiable L1-like loss can be used.

For the proposed architecture, the weights of the CNN core 20 and the weights of the refiner blocks 300, 310, if any, have to be learned.

Regarding the CNN core 20, $LOSS_{21}$, $LOSS_{22}$ and $LOSS_{23}$ can be optimized separately or in combination with the others. Combining multiple losses help to train the architecture on different tasks.

In embodiments, the total loss $LOSS_{20}$ for CNN core 20 is the result composition of each task's loss $LOSS_{21}$, $LOSS_{22}$ and $LOSS_{23}$. The following formulae may be used for each training image made of pixels p:

$$LOSS_{21} = \frac{1}{PL} \sum_p \sum_l \rho(H_l(p) - \widehat{H_l}(p))$$

$$LOSS_{22} = \frac{1}{PC} \sum_p \sum_c \rho(S_c(p) - \hat{S}_c(p))$$

$$LOSS_{23} = \frac{1}{N} \sum_a \rho(p_a - \widehat{p_a})$$

where $\widehat{H_l}(p)$ is the value at pixel p of the inferred heatmap for feature l amongst the L features, $\hat{S}_c(p)$ is the value at pixel p of the segmentation mask for class c among the C classes, $p_a$ is the inferred (global image) probability for class a in the N-sized vector, $H_l(p)$, $S_c(p)$, $p_a$ are the corresponding (true) reference outputs, P is the number of pixels in the images, and ρ modulates the influence of the loss as defined in the Huber loss (or smooth LA Loss) formulation:

$$\rho(d) = \begin{cases} \frac{1}{2}d^2, & \text{if } |d| \le \delta \\ \delta\left(|d| - \frac{1}{2}\delta\right), & \text{otherwise} \end{cases}$$

In default setting, δ=0.5

One may note that the same formulae can be used when a merging heatmap or mask is generated by the CNN 1 in addition to the heatmaps or masks it merges. In that case, a value for index l or c may designate such "merging" heatmap or mask.

Where N-sized vector gives a pure classification (i.e. $p_a$ is assigned to 1 if the reference image belongs to class a), $LOSS_{23}$ may be a log-loss as follows:

$$LOSS_{23} = -\frac{1}{N} \sum_a p_a \log(\widehat{p_a})$$

Where $\widehat{p_a}$ are constructed using a softmax function transforming the output of the neural network into a probabilistic formulation.

To take into account all the reference images forming a subset of training data, the losses to be minimized can be modified as follows:

$$LOSS_{i,subset} = \sum_n \beta i^{(n)} LOSS_i^{(n)}$$

where n represent the n-th reference image of the subset (also referred as mini-batch), i is 21, 22, 23 depending on the loss considered and βi are weights. This formula can be used even if some labels (i.e. reference output $H_l(p), S_c(p), p_a$) are missing from the training data. In that case, corresponding $\beta_i$ can be set to 0 to avoid the missing labels to influence the loss and consequently weights in part of the networks where the gradient would have been back propagated otherwise.

Therefore, the total loss $LOSS_{20}$ for CNN core 20 can be $$LOSS_{20} = \alpha_{21}.LOSS_{21,subset} + \alpha_{22}.LOSS_{22,subset} + \alpha_{23}.LOSS_{23,subset}$$

Learning rates $\alpha_i$ are non-zero and are used to rescale the losses (because the corresponding outputs have different ranges of values).

The post-processing blocks 30 may also have their own total loss $LOSS_{30}$ which can be computed based on the loss of each refiner block 300, 310. The above elementary formulae may be used. For instance, regarding the heatmaps, $$LOSS_{21-1} = \frac{1}{PL} \sum_p \sum_l \rho(H_l(p) - \widehat{H_l}(p))$$

where $\widehat{H_l}(p)$ is the value at pixel p of the refiner heatmap 309 for feature l. In some embodiment reference $\widehat{H_l}(p)$ of $LOSS_{21-1}$ may be modified from reference $\widehat{H_l}(p)$ of $LOSS_{21}$.

The same formula is used for other refiner blocks, using the respective refiner outputs 319, etc.

Consequently, $LOSS_{30} = LOSS_{21-1} + LOSS_{21-2} + \ldots$

An overall loss L for the entire CNN 1 can be computed from the total loss of CNN core 20 and the total loss of each post-processing block 30:

$$L = \alpha_{20} LOSS_{20} + \alpha_{30} LOSS_{30} + \alpha_{30'} LOSS_{30'} + \ldots$$

where learning (non zero) rates $\alpha_i$ still rescale the losses.

The training phase of CNN 1 thus seeks to minimize the overall loss L estimated from the elementary loss $LOSS_{20}$ associated with the outputs of the multiple layer-based neural decoders and from the refiner losses $LOSS_{21-1}$, $LOSS_{21-2}$ associated with the refiner outputs of the layer-based refiner blocks respectively.

In practice a three-step learning process can be implemented where:

in a first phase, only the CNN core 20 (i.e. only the layer-based neural encoder 200 and the multiple layer-based neural decoders 210, 220, . . . ) are trained by minimizing the elementary loss $LOSS_{20}$ alone. This corresponds to using overall loss L where $\alpha_{30}$ and $\alpha_{30'}$ are set to 0 while $\alpha_{20}$ is kept at its non-zero value (e.g. 1). The weights of the layers in ECC core 20 are then updated, while the weights of the layers in the refiner blocks are not modified;

next in a second phase, only the post-processing blocks 30 are trained by minimizing a loss estimated from the refiner losses only. Each loss $LOSS_{30}$, $LOSS_{30'}$ can be used separately to train separately each post-processing block 30, 30'. Preferably, they are used together to train all the post-processing blocks in a single pass. For instance, the post-processing loss $L_{post} = \alpha_{30} LOSS_{30} + \alpha_{30'} LOSS_{30'} + \ldots$ can be used, i.e. the overall loss L where $\alpha_{20}$ is set to 0 while $\alpha_{30}$ and $\alpha_{30'}$ are kept non-zero (e.g. 1). The weights of the layers in the refiner blocks are then updated, while the weights of the layers in ECC core 20 are not modified during this phase;

finally, in a last phase, the entire CNN 1 is trained by minimizing the overall loss L. For instance, low learning rates $\alpha_{20}$, $\alpha_{30}$ and $\alpha_{30'}$ equal to 0.5, may be used.

The three phases may be performed using the same subset of training data or different subsets.

Initial values of the layer weights can be either acquired using an existing state (called transfer learning) or can be learned from scratch (weights are initialized using standard random distribution with values near zero or any other initialization scheme) or partly initialized using an existing state while others remaining unknown weights are initialized with zero values or random values near to zero.

The training data used are usually labelled by humans. For recurrent CNN architecture, a training video sequence is usually used and hence each reference image of the training video sequence must be labelled. Furthermore, for multiple task recurrent architectures such as the one proposed in FIG. 1, a large number of labels must be generated for each reference image of the training video sequence or sequences (multiple heatmaps, multiple segmentation masks and multiple emotions or other attributes). All of this amounts to considerable work for an individual or even for a team.

To cope with this issue, it is proposed to generate virtual prior knowledge (i.e. previous annotation) for a first annotated reference image, based on its annotations (i.e. its associated first reference outputs). Advantageously, any annotated image can be used, without requiring a video sequence for training the CNN. In this proposal, a frame-to-frame movement is simulated that is applied to the first reference output (i.e. reference feature heatmaps and/or segment masks).

This may be done by first obtaining a first reference image and associated true outputs (heatmaps, segmentation masks) referred to as first reference outputs. Next, one or more transformations to be applied to an object (e.g. a face or features of a face) in the first reference image are determined. The transformations simulate object movements. They are then applied to the first reference outputs (heatmaps and masks), resulting in generating previous reference outputs (heatmaps and masks) for the first reference image. The previous reference outputs form virtual prior knowledge for the annotated first reference image. All of them can be used to train the CNN.

Figure 4:
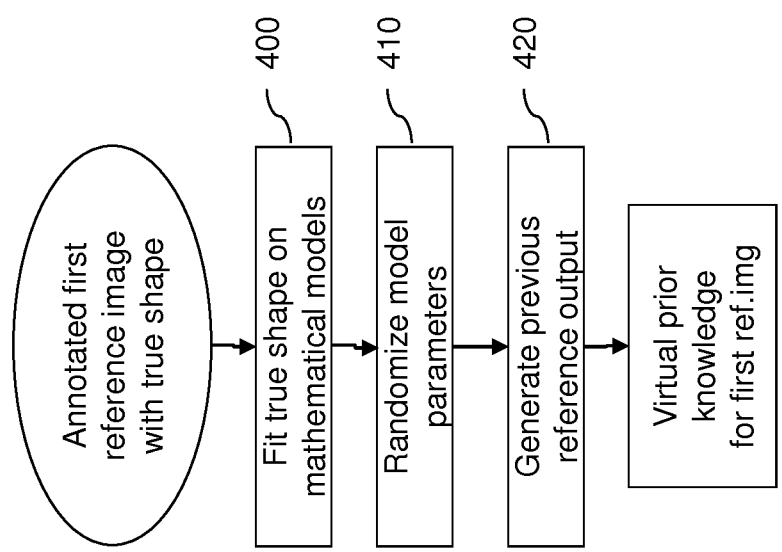
FIG. 4 illustrates, using a flowchart, general steps for generating virtual prior knowledge from an annotated reference image according to embodiments of the invention.

Exemplary process to generate virtual prior knowledge from an annotated image is shown in FIG. 4. It uses a face shape generator to simulate face movements.

At step 400, face shape defined by the annotated first reference image (in fact by its feature 2D or 3D coordinates) is first matched with a rigid geometric transformation that can simulate object movements (based on pose parameters, e.g. to estimate new face poses) and then matched with a non-rigid statistical face model that can simulate deformations in the object shape (i.e. mathematical deformation based on PCA or blendshape parameters). Both rigid and non-rigid transformation together parametrize the original face shape and thus provide a face simulation formula that creates different face expressions and movements depending on the tunable pose and blendshape parameters.

At step 410, a set of pose and blendshape parameters is at least partially randomly perturbed (i.e. selected) to obtain a slightly modified face shape.

New generated shape (i.e. selected parameters) is then used at step 420 to generate new temporal reference outputs (heatmaps, masks) from the first reference outputs associated with the first reference image.

Optionally, a plurality of sets of parameters may be determined at step 410 and then applied at step 420 to obtain plurality sets of prior knowledge (heatmaps, masks) for the same annotated first image. This multiple generation is particularly useful during the training to avoid using the same input inference for the neural network.

A similar approach can be used to generate temporal segmentation masks. In this case, an affine transformation is applied to the first reference mask and its contours may be perturbed randomly and/or using standard morphological operators to offer some extended variations to the shape of the mask.

The accuracy of the CNN 1 has been tested using a validation/testing data set different from the training data set. The accuracy of the CNN 1 after training is evaluated by measuring different errors between the expected result (the true outputs labelled in the validation data set) and measured result (the inference outputs produced by CNN 1 based on the validation images of the validation data set).

For regressions, the results accuracy is measured using a Root Mean Square Error (RMSE): the higher the RMSE, the better the trained CNN accuracy.

For feature locating tasks (e.g, heatmaps), the Normalized Mean Error (NME) which measures the normalized (e.g. using object bounding box size) distance between obtained and true location of the feature considered is used: the lower the NME, the better the trained CNN accuracy.

For segmentations the results accuracy is measured using the Intersection over Union measure (denoted IoU): the larger the IoU, the better the pixelwise alignment between the true and the resulting masks.

In a first testing experiment, two training data sets were considered:

Dataset A contained about 20,000 face images and corresponding labelled emotion accuracy scores;

Dataset B contained 6000 face images and corresponding face shapes, each made of 51 heatmaps (i.e. 51 face features have been considered).

In test 1, only the emotion detection task has been considered, without prior knowledge (i.e. CNN not recurrent). CNN (without decoders 210, 220) has been trained using only Dataset A.

In test 2, only the locating face feature task (heatmaps) has been considered, without prior knowledge (i.e. CNN not recurrent). CNN (without decoder 220 and fully connected branch 230) has been trained using only Dataset B.

In test 3, both datasets A and B have been used together to train CNN 1 to solve both tasks at the same time. No prior knowledge has been reinjected (i.e. CNN not recurrent). Decoder 220 has not been used.

Test 4 was similar to test 3 but heatmaps have been reinjected as temporal prior knowledge during the training.

All tests rely on the same architecture (i.e. same layers), the same hyper-parameters and weight initialization.

The following table summarizes the results accuracy for the tests of the first experiment:

|  | Test 1 | Test 2 | Test 3 | Test 4 |
|---|---|---|---|---|
| Emotion RMSE | 0.809 | x | 0.813 | 0.818 |
| Features loc. NME | x | 0.0344 | 0.0344 | 0.0335 |

This table first shows that the combination of the two datasets for the training improves the final accuracy scores (in particular emotion detection) of the network. Even if the two datasets are annotated to solve different problems, each one helps the network to learn to solve the other related problem.

The table also shows that the CNN accuracy is reinforced when using temporal prior knowledge. The estimated heatmaps at previous inference is a prior knowledge that substantially improves the heatmaps estimated at the next inference but also the emotion (or any attribute) detection.

In a second testing experiment, Dataset B was used with another dataset (namely Dataset A'). Dataset A' contained around 5000 images of human upper body and corresponding body mask.

As for the first experiment, in test 1=, only the upper body segmentation task has been considered, without prior knowledge (i.e. CNN not recurrent). CNN (without decoders 210, 230) has been trained using only Dataset A'.

In test 2, only the locating face feature task (heatmaps) has been considered, without prior knowledge (i.e. CNN not recurrent). CNN (without decoder 220 and fully connected branch 230) has been trained using only Dataset B.

In test 3, both datasets A and B have been used together to train CNN 1 to solve both tasks at the same time. No prior knowledge has been reinjected (i.e. CNN not recurrent). Decoder 230 has not been used.

Test 4 was similar to test 3 but heatmaps have been reinjected as temporal prior knowledge during the training.

All tests rely on the same architecture (i.e. same layers), the same hyper-parameters and weight initialization.

The following table summarizes the results accuracy for the tests of the second experiment:

|  | Test 1 | Test 2 | Test 3 | Test 4 |
|---|---|---|---|---|
| Body mask Accuracy | 0.911 | x | 0.9107 | 0.936 |
| Features loc. NME | x | 0.0344 | 0.0342 | 0.0335 |

The combination of the two datasets for the training slightly improves the final accuracy scores of feature locating task. Temporal prior knowledge substantially improves the accuracy scores for both tasks (where the Body mask IoU is greater and Feature locating NME is lower).

The above shows the benefits of the proposed multiple-task temporal CNN architecture. These benefits make it possible to reduce the depth (number of hidden layers) of the network with only little effect on resulting values.

The described architecture can be adapted.

For instance, the depth of the feature maps and the number of layers can be either reduced or expanded according to required performance at inference time.

It can also be adapted to the processing capacities of the image processing device.

For instance, to address low-end Android, iOS, etc. devices, the depth of feature maps 25 can be slightly reduced to speed up convolution operations. IRB blocks may be designed to apply efficient yet robust filters at each hidden layer.

iOS implementation is based on efficient CoreML based convolutional operators relying on modern phone GPU chipsets. On low-end platforms implementation is based on optimized operators using Neon/SIMD instructions and multi-threading for matrix multiplications and other usual mathematical operations on multidimensional matrices (tensors). On top of it, the described architecture may rely on highly optimized quantized operators where both weights and feature maps are quantized using 8-bit structures. This optimizes computations and memory usage.

More generally, a Mobilenet-based architecture is preferably used for low-resource devices. The proposed Mobilenet v2-based architecture provide a real-time and stable face feature locating technique which can be applied to video sequences captured by mobile devices. Real-time processing can thus be achieved.

On the other hand, deeper CNNs with more complex operations can be used with more powerful computers. For instance, Resnet-based architecture can be used.

CNN architectures are optimized based on common techniques such as data augmentation, hyperparameters optimization (grid, random, etc.), network architecture search, batch normalization, etc.

Figure 5:
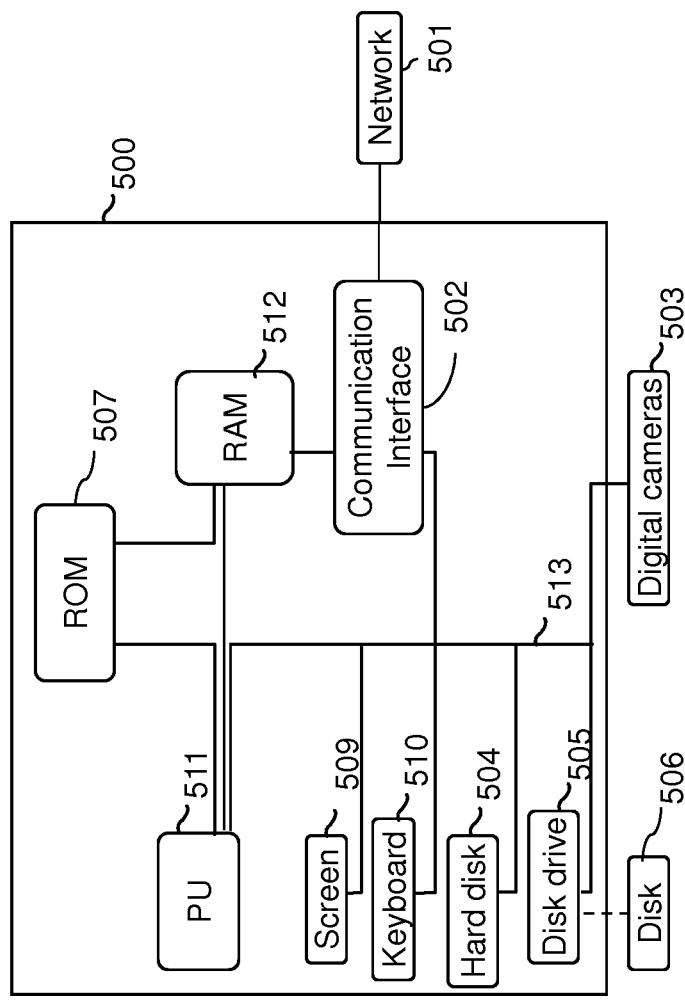
FIG. 5 is a schematic block diagram of a computing device for implementation of one or more embodiments of the invention.

FIG. 5 schematically illustrates a computer device 500 used for the present invention. It is preferably a device such as a micro-computer, a workstation or a light portable device (mobile phone for instance). The device 500 comprises a communication bus 513 to which there are preferably connected:

- a computer processing unit 511, such as a microprocessor, central processing unit CPU, graphical processing unit GPU, data processing unit DPU, image processing unit IPU;
- a read only memory 507, denoted ROM, for storing computer programs for implementing the invention;
- a random access memory 512, denoted RAM, for storing the executable code of methods according to the invention as well as the registers adapted to record variables and parameters necessary for implementing methods according to the invention; and
- at least one communication interface 502 connected to a communication network 501 over which data may be transmitted.

Optionally, the device 500 may also include the following components:

- a data storage means 504 such as a hard disk, for storing computer programs for implementing methods according to one or more embodiments of the invention as well as training and validation data;

a disk drive 505 for a disk 506, the disk drive being adapted to read data from the disk 506 or to write data onto said disk;

a screen 509 for displaying data and/or serving as a graphical interface with the user, by means of a keyboard 510 or any other pointing means.

The device 500 may be connected to various peripherals, such as for example source cameras 503, each being connected to an input/output card (not shown) so as to supply data to the device 500.

Preferably the communication bus provides communication and interoperability between the various elements included in the device 500 or connected to it. The representation of the bus is not limiting and in particular the central processing unit is operable to communicate instructions to any element of the device 500 directly or by means of another element of the device 500.

The disk 506 may optionally be replaced by any information medium such as for example a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 507, on the hard disk 504 or on a removable digital medium such as for example a disk 506 as described previously. According to an optional variant, the executable code of the programs can be received by means of the communication network 501, via the interface 502, in order to be stored in one of the storage means of the device 500, such as the hard disk 504, before being executed.

The central processing unit 511 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 504 or in the read only memory 507, are transferred into the random access memory 512, which then contains the executable code of the program or programs, as well as registers for storing the variables and parameters necessary for implementing the invention.

In a preferred embodiment, the device is a programmable apparatus which uses software to implement the invention. However, alternatively, the present invention may be implemented in hardware (for example, in the form of an Application Specific Integrated Circuit or ASIC).

Although the present invention has been described herein above with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. An image processing device comprising a processor-implemented neural network, the neural network comprising:
   an input block configured to obtain successive inference inputs from successive input images forming an input sequence,
   a layer-based neural encoder configured to determine, during an inference of the processor-implemented neural network, feature maps from one of the inference inputs, and
   multiple layer-based neural decoders, each having at least one separate layer not shared with other layer-based neural decoder or decoders, configured to generate, during the inference, multiple respective inference outputs from the feature maps,
   wherein at least one of the inference outputs is an inference image of image type spatially characterizing image content of the input image,
   wherein the inference input of the layer-based neural encoder for a next inference of the processor-implemented neural network is built from a next input image of the input sequence and from at least one image-type inference output generated during a previous inference based on a previous image in the input sequence.

2. The image processing device of claim 1, wherein the image-type inference output generated during the previous inference is concatenated with the next input image to build the inference input for the next inference based on the next input image.

3. The image processing device of claim 1, wherein the processor-implemented neural network further comprises a preprocessing block configured to preprocess the image-type inference output before building the inference input for the next inference, wherein the preprocessing includes:
   estimating a movement shift between the previous input image and the next input image, and
   shifting the image-type inference output by the estimated movement.

4. The image processing device of claim 1, wherein the processor-implemented neural network further comprises a block configured to preprocess the image-type inference output before building the inference input for the next inference, wherein the preprocessing includes:
   fusing, into a single image-type inference output to be used for the building of the inference input, a plurality of image-type inference outputs that spatially characterize various image contents of the input image.

5. The image processing device of claim 1, wherein the inference outputs include one merging inference output that merges two or more other inference outputs.

6. The image processing device of claim 5, wherein the image-type inference output used to build the inference input for the next inference is the merging inference output.

7. The image processing device of claim 1, wherein the inference outputs include one or more from:
   feature heatmap images representing probabilities that the corresponding pixels of the input image are located at respective image feature locations,
   segmentation mask images representing probabilities that the pixels of the input image belong to respective image segmentation classes, and
   a vector made of multiple probabilities of image classifications of the input image.

8. The image processing device of claim 1, wherein the at least one image-type inference output for building the inference input for the next inference is selected from:
- a feature heatmap image representing probabilities that the corresponding pixels of the previous input image are located at an image feature location, and
- a segmentation mask image representing probabilities that the pixels of the previous input image belong to an image segmentation class.

9. The image processing device of claim 1, wherein the processor-implemented neural network further comprises a post-processing block configured to post-process the image-type inference output generated during the inference to obtain a post-processed image-type inference output, wherein the post-processing includes:
- applying a plurality of cascaded layer-based refiner blocks, each layer-based refiner block applying neural layers to a refiner input made
  - from the input image and
  - from the image-type inference output for the first layer-based refiner block of the plurality and from a refiner output of the preceding layer-based based refiner block for the subsequent layer-based refiner blocks of the plurality.

10. The image processing device of claim 9, wherein the image-type inference output used to build the inference input for the next inference is the post-processed image-type inference output.

11. The image processing device of claim 9, wherein the processor-implemented neural network is trained by minimizing an overall loss estimated from an elementary loss associated with the inference outputs of the multiple layer-based neural decoders and from refiner losses associated with the refiner outputs of the layer-based refiner blocks respectively.

12. The image processing device of claim 11, wherein the training includes three sub-steps:
- a first sub-step of training only the layer-based neural encoder and the multiple layer-based neural decoders by minimizing the elementary loss alone,
- a second sub-step of training only the layer-based refiner blocks by minimizing a loss estimated from the refiner losses only, and
- a final sub-step of training the whole layer-based neural network by minimizing the overall loss.

13. An image processing method using a processor-implemented neural network, the method comprising the following steps:
- obtaining successive inference inputs from successive input images forming an input sequence, and
- performing inferences of the processor-implemented neural network using the successive inference inputs, wherein performing an inference includes:
  - determining, using a layer-based neural encoder of the processor-implemented neural network, feature maps from one of the inference inputs, and
  - generating, using multiple layer-based neural decoders, each having at least one separate layer not shared with other layer-based neural decoder or decoders, multiple respective inference outputs from the feature maps, wherein at least one of the inference outputs is an inference output of image type spatially characterizing image content of the input image, wherein the inference input of the layer-based neural encoder for a next inference is built from a next input image of the input sequence and from at least one image-type inference output generated during a previous inference based on a previous image in the input sequence.

14. The image processing method of claim 13, further comprising:
- obtaining training data for a training cycle of the processor-implemented neural network, wherein obtaining training data includes:
  - obtaining at least one first reference image and at least one associated first reference output,
  - determining at least one transformation to be applied to an object in the first reference image, and
  - applying the transformation to the first reference output to generate a previous reference output for the first reference image,
- training the processor-implemented neural network during training cycles, wherein a training input of the processor-implemented neural network for a training cycle is built from the first reference image and the generated previous reference output, and a training output of the processor-implemented neural network for the training cycle is compared to the first reference output.

15. A non-transitory computer-readable medium storing a program which, when executed by a microprocessor or computer system in a device, causes the device to perform the method of claim 13.

16. The image processing device of claim 2, wherein the processor-implemented neural network further comprises a preprocessing block configured to preprocess the image-type inference output before building the inference input for the next inference, wherein the preprocessing includes:
- estimating a movement shift between the previous input image and the next input image, and
- shifting the image-type inference output by the estimated movement.

17. The image processing device of claim 2, wherein the processor-implemented neural network further comprises a block configured to preprocess the image-type inference output before building the inference input for the next inference, wherein the preprocessing includes:
- fusing, into a single image-type inference output to be used for the building of the inference input, a plurality of image-type inference outputs that spatially characterize various image contents of the input image.

18. The image processing device of claim 3, wherein the processor-implemented neural network further comprises a block configured to preprocess the image-type inference output before building the inference input for the next inference, wherein the preprocessing includes:
- fusing, into a single image-type inference output to be used for the building of the inference input, a plurality of image-type inference outputs that spatially characterize various image contents of the input image.

19. The image processing device of claim 2, wherein the inference outputs include one merging inference output that merges two or more other inference outputs.

20. The image processing device of claim 3, wherein the inference outputs include one merging inference output that merges two or more other inference outputs.

* * * * *